United States Patent
Luoma

(10) Patent No.: US 12,439,127 B2
(45) Date of Patent: Oct. 7, 2025

(54) MEDIA CHANNEL REWARDS APPLICATION WITH LIVE POLLING

(71) Applicant: DISH NETWORK L.L.C., Englewood, CO (US)

(72) Inventor: Gerritt A. Luoma, Littleton, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 17/987,684

(22) Filed: Nov. 15, 2022

(65) Prior Publication Data

US 2024/0163519 A1    May 16, 2024

(51) Int. Cl.
| | |
|---|---|
| H04N 7/16 | (2011.01) |
| H04L 65/60 | (2022.01) |
| H04L 67/306 | (2022.01) |
| H04N 21/431 | (2011.01) |
| H04N 21/4784 | (2011.01) |

(52) U.S. Cl.
CPC ......... *H04N 21/4784* (2013.01); *H04L 65/60* (2013.01); *H04L 67/306* (2013.01); *H04N 21/4312* (2013.01)

(58) Field of Classification Search
CPC ........... H04N 21/4784; H04N 21/4312; H04N 21/442; H04N 21/4532; H04N 21/4668; H04L 67/306
See application file for complete search history.

(56) References Cited

U.S. PATENT DOCUMENTS

| | | | |
|---|---|---|---|
| 8,601,502 B2 | 12/2013 | Higgins et al. | |
| 2003/0083943 A1* | 5/2003 | Adams | G06Q 30/0212 463/16 |
| 2003/0172376 A1* | 9/2003 | Coffin, III | H04H 60/73 725/23 |
| 2010/0202755 A1* | 8/2010 | Ariya | G11B 27/034 386/E5.003 |
| 2011/0288912 A1* | 11/2011 | McCrea | G06Q 30/0217 705/14.2 |
| 2012/0272278 A1* | 10/2012 | Bedi | H04N 21/25435 725/105 |
| 2016/0078465 A1* | 3/2016 | Chai | H04N 21/4784 705/14.27 |

OTHER PUBLICATIONS

"Channel Points Guide for Viewers", https://help.twitch.tv/s/article/viewer-channel-point-guide?language=en_US, Sep. 8, 2022, 5 pages.
"How to Use Polls", https://help.twitch.tv/s/article/how-to-use-polls?language=en_US, Nov. 26, 2022, 6 pages.

* cited by examiner

*Primary Examiner* — Gigi L Dubasky
(74) *Attorney, Agent, or Firm* — Jeremiah J. Baunach; Frontier IP Law PLLC

(57) ABSTRACT

An example system and method may provide a media channel rewards application with live polling. An example system may measure a viewing period of the media stream, determine a quantity of digital points respective to a user profile and the media stream based on the measured viewing period, and store a digital record associated with the user profile and the media channel, which digital record indicates the quantity of digital points. In some instances, the system may generate a graphical overlay for a media stream of a media channel and provide a graphical interface in the overlay based on the quantity of digital points associated with the user profile and the media stream.

16 Claims, 7 Drawing Sheets

MEDIA CHANNEL REWARDS APPLICATION WITH LIVE POLLING

TECHNICAL FIELD

The present disclosure relates to a system for providing interaction with media streams or channels such as television programming. Some implementations relate to an adaptable system for providing sports channel rewards with live polling, for example, where the sports channel is transmitted via a satellite and the live polling occurs via one or more digital channels.

BRIEF SUMMARY

Media, such as a television program provided by television networks, is typically static because channels unilaterally send information to customers, for example, via a broadcast server 122, such as a cable or satellite television provider. Unfortunately, these static channels previously had no effective way to drive engagement and improve customer's experience.

The systems, operations, features, and other technology described herein beneficially provide technical solutions to the technical limitations that previously limited interaction and engagement. The technology allows media channels to add an overlay or screen over media, for example, on a television, thereby providing a customized experience for individual users. For instance, the technology may provide customized interfaces, gamification, interaction, polling, or targeted ads.

In some implementations, the technology grants users digital rewards points based on live viewership time and, potentially, on a channel-by-channel basis. For instance, a football channel may award a first set of digital points for watching live football games while a baseball channel awards a second set of digital points based on watching live baseball games. Accordingly, a user can gain rewards, reputation, status, collectables, or scores that demonstrate, for example, to their friends or other users that they are fans of certain channels or programs. Furthermore, implementations of the technology may allow users to gain points via other interactions with the media channels, such as by interacting with interactable elements in the channel. For instance, although other implementations are possible, a user may stake a portion of their digital points in a bet that a certain team in a game televised on a certain media channel will win the game. The technology may automatically track the staked points, determine an outcome of the interaction element relative to the stake, and increase or decrease the points. Accordingly, users can be designated as superfans, experts, or receive other rewards for their interactions.

The technology may award a certain quantity of points for a corresponding period of viewing, which the users may bet or stake in live (e.g., real-time) polling, quiz, or other interactions (e.g., via a smart television or television receiving device), thereby allowing them to increase or decrease their points, demonstrate their knowledge, or gain rewards. In some instances, a channel may exchange digital or physical rewards for the digital points for that channel, such as unlockable content, event tickets, user statuses (e.g., novice, advanced, expert), badges, or otherwise. Additionally, a channel may gain additional insight into preferences, viewership statistics, or other information for users via these interactions, which both drive engagement and provide useful upstream data.

Implementation of the technology may overlay graphical interface displaying information retrieved from a first source on a screen showing media from a second source. In some instances, the technology may use a local television box that is connected to the internet to generate overlayed graphical interfaces or display for interaction elements and user customization, which the local television box may overlay or otherwise display on a screen with media, such as a television program received via a satellite dish from a broadcast satellite service, from cable received from a cable television service, internet or IP television, or OTT streaming devices (over the top, internet-connected devices) or services.

The technology may include an improved media channel rewards application with live polling, which may be configured to perform particular operations or actions by virtue of having software, firmware, hardware, or a combination of them installed on the system that in operation causes or cause the system to perform the actions. One general aspect of the system includes a method that includes: generating one or more graphical overlays for a media stream of a media channel; measuring a viewing period of the media stream; determining a quantity of digital points respective to a user profile and the media stream based on the measured viewing period; storing a digital record associated with the user profile and the media channel, the digital record indicating the quantity of digital points; and providing a graphical interface based on the quantity of digital points associated with the user profile and the media stream.

Other embodiments of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation.

The use of ordinals such as first, second and third does not necessarily imply a ranked sense of order, but rather may only distinguish between multiple instances of an act or structure.

The headings and Abstract of the Disclosure provided herein are for convenience only and do not interpret the scope or meaning of the implementations.

With reference to the figures, reference numbers may be used to refer to example components found in any of the figures, regardless of whether those reference numbers are shown in the figure being described. Further, where a reference number includes a letter referring to one of multiple similar components (e.g., component 000a, 000b, and 000n), the reference number may be used without the letter to refer to one or all of the similar components.

Figure 1:
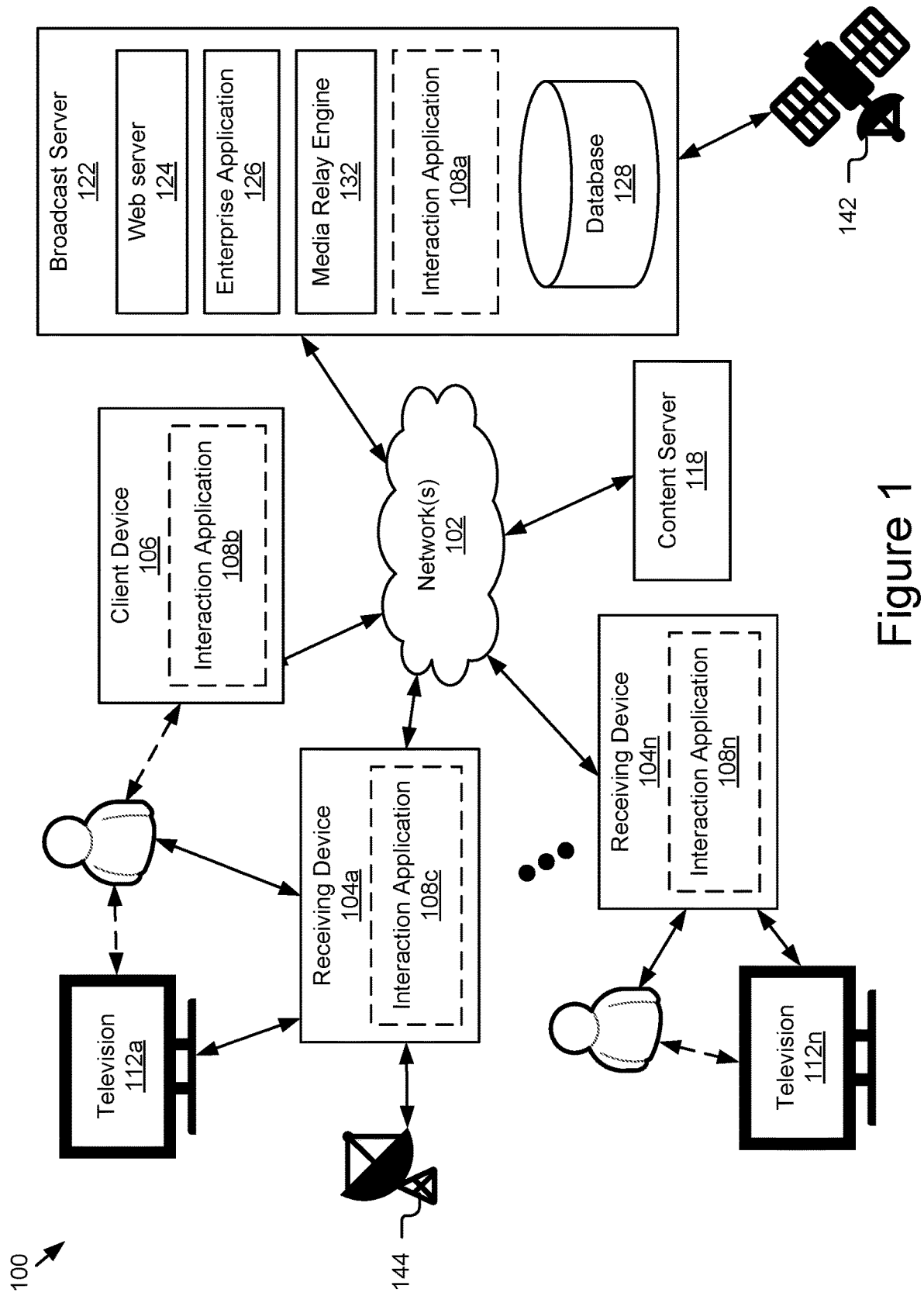
FIG. 1 is a block diagram of an example system for providing a media channel rewards application with live polling.

FIG. 1 is a block diagram of an example system 100 for providing a media channel rewards application with live polling, such as the interaction application 108 and other features described throughout this disclosure. The illustrated system 100 may include one or more receiving devices 104a . . . 104n, client device(s) 106, televisions 112a . . . 112n, broadcast servers 122, and content servers 118 (although different configurations and quantities are possible), which may be electronically communicatively coupled via a network 102 for interaction with one another, although other system configurations are possible including other devices, systems, and networks. In some implementations, the network 102 or general system may include one or more satellites 142 and satellite dishes 144, via which a media stream may be transmitted and received, although other implementations, such as cable, web streaming, VHF or UHF radio, or other means may be used.

Before providing additional details regarding the operation and constitution of methods and systems the technology herein, the example environment 100, within which such a system may operate, will briefly be described. In the environment 100, audio, video, and/or data service providers, such as television service providers, provide their customers a multitude of video and/or data programming (hereafter, collectively and/or exclusively "programming"). Such programming is often provided by use of a receiving device 104 (interchangeably referred to herein as "box" or "machine") configured to receive the programming and communicatively coupled directly or indirectly to a presentation device, such as a television 112. The programming may include any type of media content, including, but not limited to: television shows, news, movies, sporting events, documentaries, advertisements, web videos, media clips, etc., in various formats including, but not limited to: standard definition, high definition, 4k Ultra High-Definition (HD), Ultra HD (UHD), AVI (Audio Video Interleave), FLV (Flash Video Format), WMV (Windows Media Video), MOV (Apple QuickTime Movie), MP4 (Moving Pictures Expert Group 4), WAV (Waveform Audio File Format), MP3 (Moving Picture Experts Group Layer-3 Audio), WMA (Windows Media Audio), PCM (Pulse-Code Modulation), AIFF (Audio Interchange File Format), AAC (Advanced Audio Coding), LPCM (Linear pulse code modulation), and OGG (Vorbis).

The receiving device 104 may include various processors, memories, inputs, outputs and other components. For instance, as noted above, the receiving device 104 may be built as a stand-alone box or machine that provides programming to a television 112 or other presentation device. In some implementations, the receiving device 104 may be built into a device, such as a television 112. In some implementations, the receiving device 104 may run an operating system, such as iOS™, Android™, Windows™, or otherwise, which runs applications that allows additional functionality on top of displaying media streams. For instance, an instance of the interaction application 108 or portion thereof (e.g., where its features or operations are distributed among multiple systems) may be executed on the receiving device 104, for example, to overlay information, provide interaction, or other features herein.

The receiving device 104 may interconnect to one or more communications media, sources or other devices (such as a cable head-end, satellite antenna, telephone company switch, Ethernet portal, off-air antenna, other receiving devices 104, or the like) that provide the programming. The receiving device 104 commonly receives a plurality of programming by way of the communications media or sources. Based upon selection by a user, the receiving device 104 processes and communicates the selected programming to the presentation device.

For example, as illustrated in the example of FIG. 1, a receiving device 104a may be communicatively coupled with a web server 124 of a broadcast server 122 or other device and/or communicatively coupled with a satellite 142 via satellite dish 144, for example, for receiving a media stream from a content server 118 whether directly or via the broadcast server 122. FIG. 1 illustrates a first receiving device 104a coupled with a first television 112a of a first user and a second receiving device 104n coupled with a second television 112n of a second user, although it should be noted that the system 100 may also track a single user across multiple televisions or other devices, such as the client device 106.

For convenience, examples of a receiving device 104 may include, but are not limited to, devices such as: a "media player," "streaming media player," "television converter," "receiver," "set-top box," "television receiving device 104," "television receiver," "television recording device," "satellite set-top box," "satellite receiver," "cable set-top box," "cable receiver," "media player," and/or "television tuner." Accordingly, the receiving device 104 may be any suitable converter device or electronic equipment that is operable to play back programming. Further, the receiving device 104 itself may include user interface devices, such as buttons or switches. In many applications, a remote-control device ("remote", not shown) is operable to control the receiving device 104 and/or the presentation device. The remote typically communicates with the receiving device 104 using a suitable wireless medium, such as infrared ("IR"), radio frequency ("RF"), or the like.

Examples of a presentation device may include, but are not limited to: a television 112 ("TV"), a mobile device, a smartphone, a tablet device, a personal computer ("PC"), a sound system receiver, a digital video recorder ("DVR"), a Digital Video Disc ("DVD") device, game system, or the like. Presentation devices may employ a display, one or more speakers, and/or other output devices to communicate video and/or audio content to a user. In many implementations, one or more presentation devices are communicatively coupled, directly or indirectly, to the receiving device 104. Further, the receiving device 104 and the presentation device may be integrated into a single device. Such a single device may have the above-described functionality of the receiving device 104 and the presentation device or may even have additional functionality.

The client device(s) 106 includes one or more computing devices having data processing and communication capabilities. The client device 106 may couple to and communicate with other client devices 106 and the other entities of the system 100 via the network 102 using a wireless and/or wired connection, such as the application server 122. Examples of client devices 106 may include, but are not limited to, mobile phones, wearables, tablets, laptops, desktops, netbooks, server appliances, servers, virtual machines, TVs, etc. The system 100 may include any number of client devices 106, including client devices 106 of the same or different type.

The client device 106 may be used by a user as an additional means of interaction with the content server 118 and/or broadcast server 122 112. For instance, a client device 106 may run an instance of the interaction application 108, component of the interaction application 108, or may otherwise interact with the interaction application 108 and/or web server 124 to interact with interaction elements, view leaderboards, access or redeem rewards, or perform other actions.

The interaction application 108 may include computer logic executable by a processor to perform operations described herein. For example, the interaction application 108 may synchronously and/or customizably provide information relevant to a displayed media stream and provide other interaction as described herein. As illustrated, an instance of the interaction application 108a may be executed as a web application or backend process on the broadcast server 122 (e.g., accessible via the web server 124). An instance of the interaction application 108b may be executed on a client device 106, and one or more instances of the interaction application 108c . . . 108n. It should be noted that although several instances of the interaction application 108 are illustrated as being executed on various devices, the interaction application 108 represents a set of functionalities and may be a distributed application or a remotely hosted service that provides functionalities described herein. Similarly, where multiple interaction applications 108 are used, they may be separate or distinct applications with varied logic or functionalities to perform the operations described herein.

There are a variety of systems, components, and network configurations that may also support distributed computing and/or cloud-computing environments within the communication system. For example, computing systems may be connected together within the network 102 by wired or wireless systems, by local networks or by widely distributed networks. Currently, many networks are coupled to the Internet, which provides an infrastructure for widely distributed computing and encompasses many different networks. Any such infrastructures, whether coupled to the Internet or not, may be used in conjunction with, be connected to, or comprise part of network 102.

The network 102 may include any number of networks and/or network types. For example, the network 102 may include, but is not limited to, one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The broadcast server 122 may include a web server 124, an enterprise application 126, a media relay engine 132, an interaction application 108, and/or a database 128. It should be noted that the broadcast server 122 may represent multiple physical or virtual devices or servers (e.g., an enterprise application 126 may be provided by a first device while the media relay engine 132 may be provided by a second device). In some implementations, the broadcast server 122 may receive content from a content server 118, such as a media stream or television program for a channel. The broadcast server 122, using a media relay engine 132 or device, may broadcast or relay the content/media stream to receiving devices 104, via various means, such as satellite, cable, over-the-air broadcast, or otherwise. For example, the broadcast server 122 may be provided by a satellite television service provider, such as Dish™. In some implementations, a media relay engine 132 is device comprising hardware and logic designed to relay data.

In some configurations, the enterprise application 126 and/or interaction application 108 may be distributed over the network 102 on disparate devices in disparate locations or may reside at the same locations. The client devices 106 may also store and/or operate other software such as an interaction application 108, an operating system, other applications, etc., that are configured to interact with the application server 122 via the network 102.

The content server 118 may be a server or system of a channel/network, which provides content to a broadcast server 122. The content server 118 and broadcast server 122 may part of the same system and/or company or may share data via various communication channels. For example, a sports network may send a live stream to a receiving device 104 via a satellite streaming service provided by the broadcast server 122 or in association with the broadcast server 122 (e.g., using a media relay engine 132).

The application server 122 and the content server 118 have data processing, storing, and communication capabilities, as discussed elsewhere herein. For example, the servers 122 and/or 118 may include one or more hardware servers, server arrays, storage devices and/or systems, etc. In some implementations, the servers 122 and/or 118 may include one or more virtual servers, which operate in a host server environment.

In some implementations, the enterprise application 126 may receive communications from a client device 106 or receiving device 104 in order to perform functionality described herein. The enterprise application 126 may receive information and provide information to the interaction application 108 to generate the adaptable graphical interfaces described herein, as well as perform and provide analytics and other operations. In some implementations, the enterprise application 126 may perform additional operations and communications based on the information received from client devices 106 or receiving devices 104, as described elsewhere herein.

The database 128 may be stored on one or more information sources for storing and providing access to data, such as the data storage device 208. The database 128 may store data describing client devices 106 or receiving devices 104, instances of the interaction application 108, customers, user profile or account information, records of digital points overall or on a per-channel basis, or other data, such as described herein. In some instances, the database 128 may also store pre-generated leaderboards, lists of users, social graphs or lists of user contacts, and other information.

It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
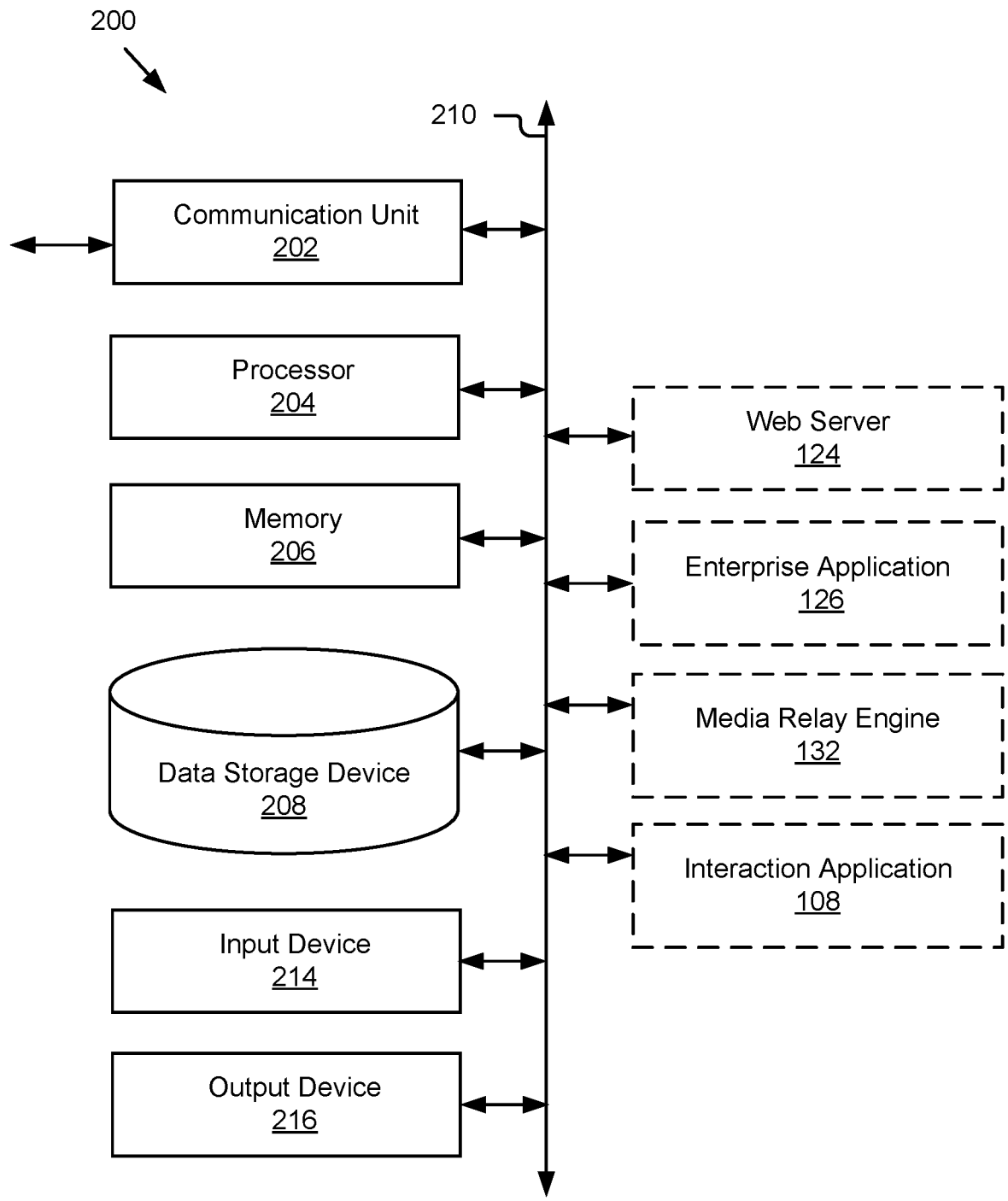
FIG. 2 is a block diagram of an example computing system including computer architecture.

FIG. 2 is a block diagram 200 of an example computing system, which may represent the computer architecture of a receiving device 104, client device 106, content server 118, broadcast server 122, and/or another device described herein, depending on the implementation. In some implementations, as depicted in FIG. 2, the computing system 200 may include an enterprise application 126, a web server 124, a media relay engine 132, an interaction application 108, or another application, depending on the configuration.

The enterprise application 126 may include computer logic executable by the processor 204 to perform operations discussed elsewhere herein. For instance, the enterprise application 126 may be coupled to the data storage device 208 to store, retrieve, and/or manipulate data stored therein and may be coupled to the web server 124, the interaction application 108, and/or other components of the system 100 to exchange information therewith.

The web server 124 may include computer logic executable by the processor 204 to process content requests (e.g., to or from a client device 106). The web server 124 may include an HTTP server, a REST (representational state transfer) service, or other suitable server type. The web server 124 may receive content requests (e.g., product search requests, HTTP requests) from client devices 106, cooperate with the enterprise application 126 to determine the content, retrieve and incorporate data from the data storage device 208, format the content, and provide the content to the interaction application 108.

In some instances, the web server 124 may format the content using a web language and provide the content to a corresponding interaction application 108 for processing and/or rendering to the user for display. The web server 124 may be coupled to the data storage device 208 to store retrieve, and/or manipulate data stored therein and may be coupled to the enterprise application 126 to facilitate its operations.

The interaction application 108 may include computer logic executable by the processor 204 on a client device 106 to provide for user interaction, receive user input, present information to the user via a display, and send data to and receive data from the other entities of the system 100 via the network 102. In some implementations, the interaction application 108 may generate and present user interfaces based on information received from the enterprise application 126 and/or the web server 124 via the network 102. For example, the interaction application 108 may display an overlay over a media stream and/or provide other interaction regarding the media stream such as acquiring digital points or user statuses, staking points, participating in live polls, and/or redeeming rewards.

As depicted, the computing system 200 may include a processor 204, a memory 206, a communication unit 202, an output device 216, an input device 214, and a data storage device 208, which may be communicatively coupled by a communication bus 210. The computing system 200 depicted in FIG. 2 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 200 may include various operating systems, sensors, additional processors, and other physical configurations. The processor 204, memory 206, communication unit 202, etc., are representative of one or more of these components.

The processor 204 may execute software instructions by performing various input, logical, and/or mathematical operations. The processor 204 may have various computing architectures to method data signals (e.g., CISC, RISC, etc.). The processor 204 may be physical and/or virtual, and may include a single core or plurality of processing units and/or cores. In some implementations, the processor 204 may be coupled to the memory 206 via the bus 210 to access data and instructions therefrom and store data therein. The bus 210 may couple the processor 204 to the other components of the computing system 200 including, for example, the memory 206, the communication unit 202, the input device 214, the output device 216, and the data storage device 208.

The memory 206 may store and provide access to data to the other components of the computing system 200. The memory 206 may be included in a single computing device or a plurality of computing devices. In some implementations, the memory 206 may store instructions and/or data that may be executed by the processor 204. For example, the memory 206 may store one or more of the enterprise application 126, the web server 124, the interaction application 108, and their respective components, depending on the configuration. The memory 206 is also capable of storing other instructions and data, including, for example, an operating system, hardware drivers, other software applications, databases, etc. The memory 206 may be coupled to the bus 210 for communication with the processor 204 and the other components of computing system 200.

The memory 206 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 204. In some implementations, the memory 206 may include one or more of volatile memory and non-volatile memory (e.g., RAM, ROM, hard disk, optical disk, etc.). It should be understood that the memory 206 may be a single device or may include multiple types of devices and configurations.

The bus 210 can include a communication bus for transferring data between components of a computing device or between computing devices, a network bus system including the network 102 or portions thereof, a processor mesh, a combination thereof, etc. In some implementations, the enterprise application 126, web server 124, media relay engine 132 interaction application 108, and various other components operating on the computing system/device 100 (operating systems, device drivers, etc.) may cooperate and communicate via a communication mechanism included in or implemented in association with the bus 210. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 202 may include one or more interface devices (I/F) for wired and wireless connectivity among the components of the system 100. For instance, the communication unit 202 may include, but is not limited to, various types known connectivity and interface options. The communication unit 202 may be coupled to the other components of the computing system 200 via the bus 210. The communication unit 202 can provide other connections to the network 102 and to other entities of the system 100 using various standard communication protocols.

The input device 214 may include any device for inputting information into the computing system 200. In some implementations, the input device 214 may include one or more peripheral devices. For example, the input device 214 may include a keyboard, a pointing device, microphone, an image/video capture device (e.g., camera), a touch-screen display integrated with the output device 216, etc. The output device 216 may be any device capable of outputting information from the computing system 200. The output device 216 may include one or more of a display (LCD, OLED, etc.), a printer, a haptic device, audio reproduction device, touch-screen display, a remote computing device, etc. In some implementations, the output device is a display which may display electronic images and data output by a processor of the computing system 200 for presentation to a user, such as the processor 204 or another dedicated processor. In some implementations, the input device 214 may include an optical scanner or sensor, such as a camera that captures images, video, or other data.

In some implementations, the communication unit 202 or input device 214 may include a receiver or tuner for receiving broadcast media signals, such as a receiver for receiving data from a satellite dish 144, antenna, or cable television line.

The data storage device 208 may include one or more information sources for storing and providing access to data. In some implementations, the data storage device 208 may store data associated with a database management system (DBMS) operable on the computing system 200. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The data stored by the data storage device 208 may be organized and queried using various criteria including any type of data stored by them, such as in one or more databases (e.g., user profiles, user statuses, badges, ranks, contact lists, channel or stream associations, digital points, etc.), such as described herein. For example, the data storage device 208 may store the database 128. The data storage device 208 may include data tables, databases, or other organized collections of data. Examples of the types of data stored by the data storage device 208 may include, but are not limited to, the data described with respect to the figures, for example.

The data storage device 208 may be included in the computing system 200 or in another computing system and/or storage system distinct from but coupled to or accessible by the computing system 200. The data storage device 208 can include one or more non-transitory computer-readable mediums for storing the data. In some implementations, the data storage device 208 may be incorporated with the memory 206 or may be distinct therefrom.

The components of the computing system 200 may be communicatively coupled by the bus 210 and/or the processor 204 to one another and/or the other components of the computing system 200. In some implementations, the components may include computer logic (e.g., software logic, hardware logic, etc.) executable by the processor 204 to provide their acts and/or functionality. In any of the foregoing implementations, the components may be adapted for cooperation and communication with the processor 204 and the other components of the computing system 200.

It should be noted that while various methods, operations, and features are described herein, for example, in reference to FIGS. 3A-4B, other operations, orders, combinations, or features are possible and contemplated herein. For instance, the operations of FIG. 3B and/or FIG. 3C may represent an extension to those of FIG. 3A. The operations of FIGS. 4A and/or 4B may provide additional or alternative details to those of FIGS. 3A-3C or vise versa. Accordingly, while some or all of the operations or features described herein may be used together, they may be used separately or interchangeably with each other or with other operations or features without departing from the scope of this disclosure.

Figure 3A:
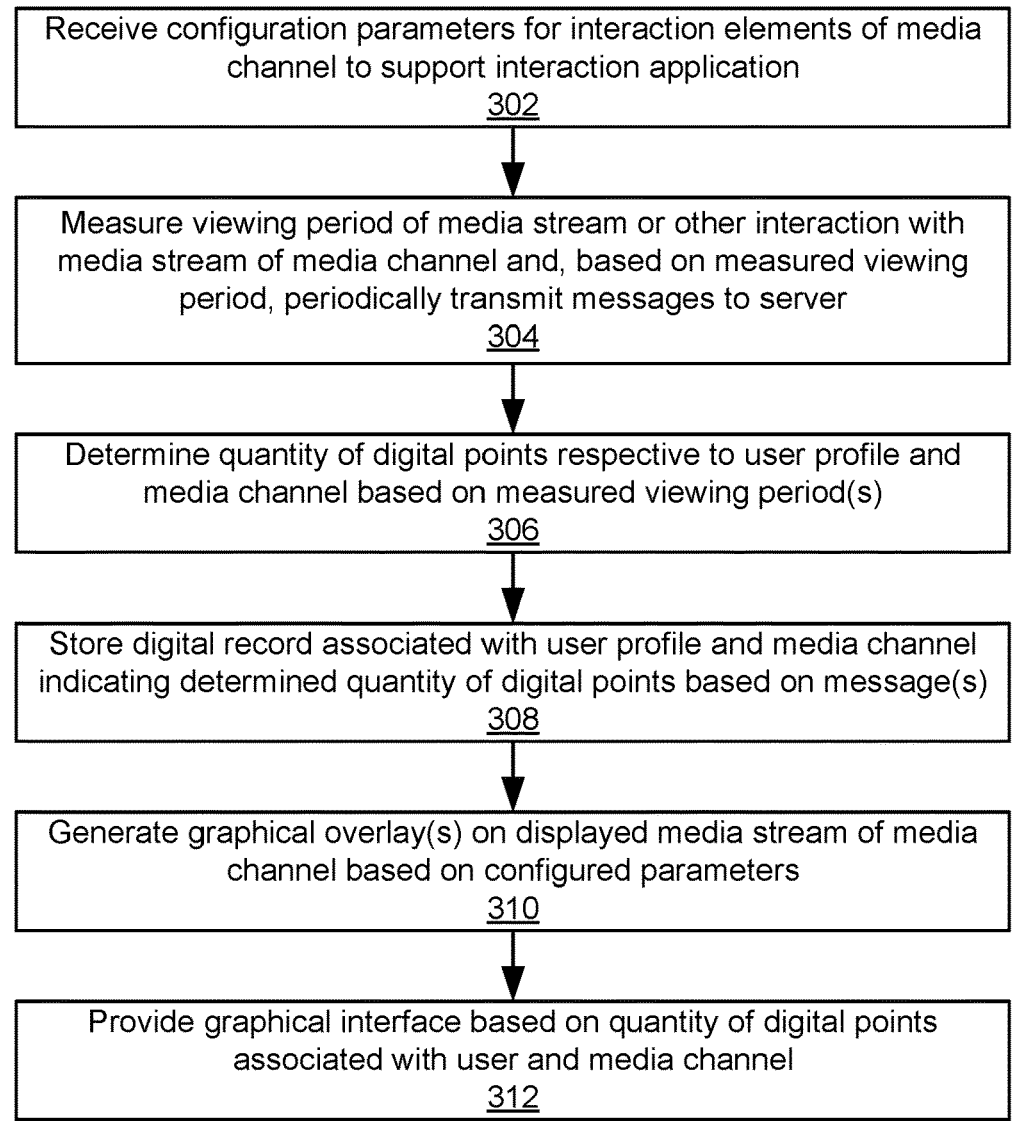
FIG. 3A is a flowchart of an example method for providing interaction with a media channel, such as by awarding digital points to a user.

FIG. 3A is a flowchart 300a of an example method for providing interaction with a media channel and/or stream, for example, by rewarding users with digital points and gamifying viewership and interaction with the media channel.

At 302, the system may receive configuration parameters for interaction elements of a media channel to support an interaction application 108. A channel (e.g., a stakeholder representative from the channel's company who is accessing the interaction application 108 or enterprise application 126) may configure various aspects of the technology, such as whether the channel is eligible for the graphical overlay provided by the interaction application 108 (e.g., the interaction application 108 may display that the channel is not yet eligible or may not provide an option for displaying an overlay for the media stream), a defined quantity of digital points awarded for a defined period of live or non-live viewing, which media streams are eligible, an expiration period, statuses or badges awarded for points or ranks among users, or other parameters.

In some implementations, the channel may configure parameters of an interaction element, such as its existence, an association of the interaction element with a certain media stream or time period, defined possible outcomes, textual or graphical elements, or otherwise. For instance, the interaction element may include a quiz, betting element, or live polling (e.g., displayed or linked to in an overlay) in which a user could interact with the interaction application 108, which information may be relayed to an enterprise application 126, as noted below. The interaction element may include a starting and/or ending time at which it, or elements of it, may be displayed or interacted with. For instance, the interaction element may include a live polling event via which a user could post a bet (e.g., stake digital points) before or during a game streamed on the media channel. The live polling event may include defined outcomes, such as whether a certain team wins the game, whether a certain player scores a goal unit, correct answers to a quiz, or voting on aspects of the game. Accordingly, not only does information flow downstream from the content server 118 and/or broadcast server 122, the interaction element/interaction application 108 allows information to flow upstream from a viewer/user (e.g., using a receiving device 104) to the content server 118 and/or broadcast server 122. In some instances, a content server 118 may use various interfaces (e.g., application programming interfaces) for communicating with the interaction application 108 and/or broadcast server 122.

In some implementations, the channel/network may also create or configure automatic or user-redeemable rewards, such as an automatically awarded rank or badge, automatically unlocked digital access, or redeemable rewards, such as tickets to an event, physical merchandise, or other rewards.

At 304, the system may measure a viewing period or other interaction with a media stream of a media channel. The system may continuously or periodically transmit messages based on measured viewing period, for example, the receiving device 104 may transmit a message to the broadcast server 122 or content server 118 at the end of an elapsed measured viewing period. For instance, the viewing period (of live or of pre-recorded media) may be 1, 5, 10, 15, etc., minutes after which a digital point is awarded and stored in a user account or record associated with user profile (or profile associated with a certain receiving device 104, billing account, or instance of an interaction application 108), although other periods or quantities are definable. The digital points may be specifically associated with a media stream, channel, program, or other attribute. Other means for increasing or decreasing a count of digital points are described elsewhere herein.

At 306, the system may determine a quantity of digital points respective to a user profile and a media channel or stream based on the measured viewing period(s). For instance, based on channel defined parameters, a defined quantity of points may be awarded after each viewing period. For instance, a viewing period may be 15 minutes of viewing (e.g., based on a length of time that the media is displayed by a receiving device 104) of live content after which a user is awarded 15 digital points. The digital points may be specific to each stream, channel, or network, so that there is a first record of points (e.g., file or entry in a table/file) for a golf channel and a second record of points for a football channel. The parameters may be separately defined for each stream, channel, or network.

At 308, the system may store a digital record associated with the user profile or account and the media channel or stream, where the record indicates the determined quantity of digital points, for example, based on the messages received indicating elapsed, measured time. For instance, a table or other file entry associated with a user profile and/or channel/network may be stored in a datastore, such as the database 128 or data storage device 208. For instance, an interaction application 108 may send a notification to an enterprise application 126 indicating that a time period has elapsed, or a certain number of points should be awarded, and, responsive, the enterprise application 126 may automatically update a record file to indicate the points.

At 310, the system may generate one or more graphical overlays on a displayed media stream of a media channel, for example, based on the configured parameters. For example, the interaction application 108 may receive a media stream using a satellite dish, determine one or more graphical interfaces, overlays, or displays (e.g., based on data received from a web server 124 of a broadcast server 122 or content server 118, as described below), and overlay the retrieved information on a display device, such as the television 112. In some instances, a remote control of a receiving device 104 may interact with an interaction elements or portion thereof displayed using a receiving device 104.

The graphical overlay may indicate that viewing is being tracked to award points, that interaction elements are available, or other information, as described elsewhere herein. The graphical overlays or interfaces may show information about a channel or media stream, about items currently displayed, interaction elements, leaderboards, user status, digital points of a user, or other data. In some instances, the graphical overlay may include interaction elements, such as live polls, quizzes, or other elements that allow interaction, such as those described in reference to FIGS. 3B and 3C.

The graphical overlays may be toggled using a remote control communicating with the receiving device 104, for instance, to display the overlay over a media stream (e.g., in a top right, bottom, etc., of an image). In some instances, the overlay may be displayed as a sidebar or frame, which shrinks the media, so that both are visible at the same time on the television 112.

In some implementations, the interaction application 108 may display full interfaces, for example, where the interaction application 108 is launched as a full application on a receiving device 104, smart television, web interface, or client device 106. For instance, a user may log in to their account or profile on a client device 106 to stake points, view leaderboards, or otherwise. The enterprise application 126 may coordinate information from multiple receiving devices 104 and/or client devices for one or more users.

In some implementations, the overlay or interfaces may include advertisements or other personalized information displayed to the user. For instance, the enterprise application 126 or interaction application 108 may identify a user along with their viewing and/or interaction data to customize an experience to the user, such as by providing advertisements relevant to the user's interests (e.g., in football instead of baseball, in a certain team, etc.).

In some instances, user data may be anonymized at broadcast server 122 or receiving device 104 level to provide increased privacy to the user while also allowing customization. For instance, a customer experience (e.g., advertisements, recommendations, etc.) may be customized at a receiving device 104, but anonymized before transmitted to a broadcast server 122, or it may be anonymized by the broadcast server 122.

At 312, the system may provide a graphical interface based on a quantity of digital points associated with the user profile and the media channel or stream. The graphical interface may be displayed in the overlay or a separate interface. The graphical interface may be an update to the overlay or a separate interface. The graphical interface may display an updated quantity of digital points held by the user profile (e.g., for a displayed channel/network). The graphical interface may display a user's status or badge indicating a rank or category for the user, which may be assigned to the user based on their digital points, previous actions, or relative rank to other users.

In some implementations, the graphical interface may be displayed as a reward to the user, for example, by providing digital access to media, additional information (e.g., "making-of" information, interviews, etc.). In some implementations, the graphical interface may allow a user to interact with the interface to redeem digital points for digital or physical rewards or perks.

Figure 3B:
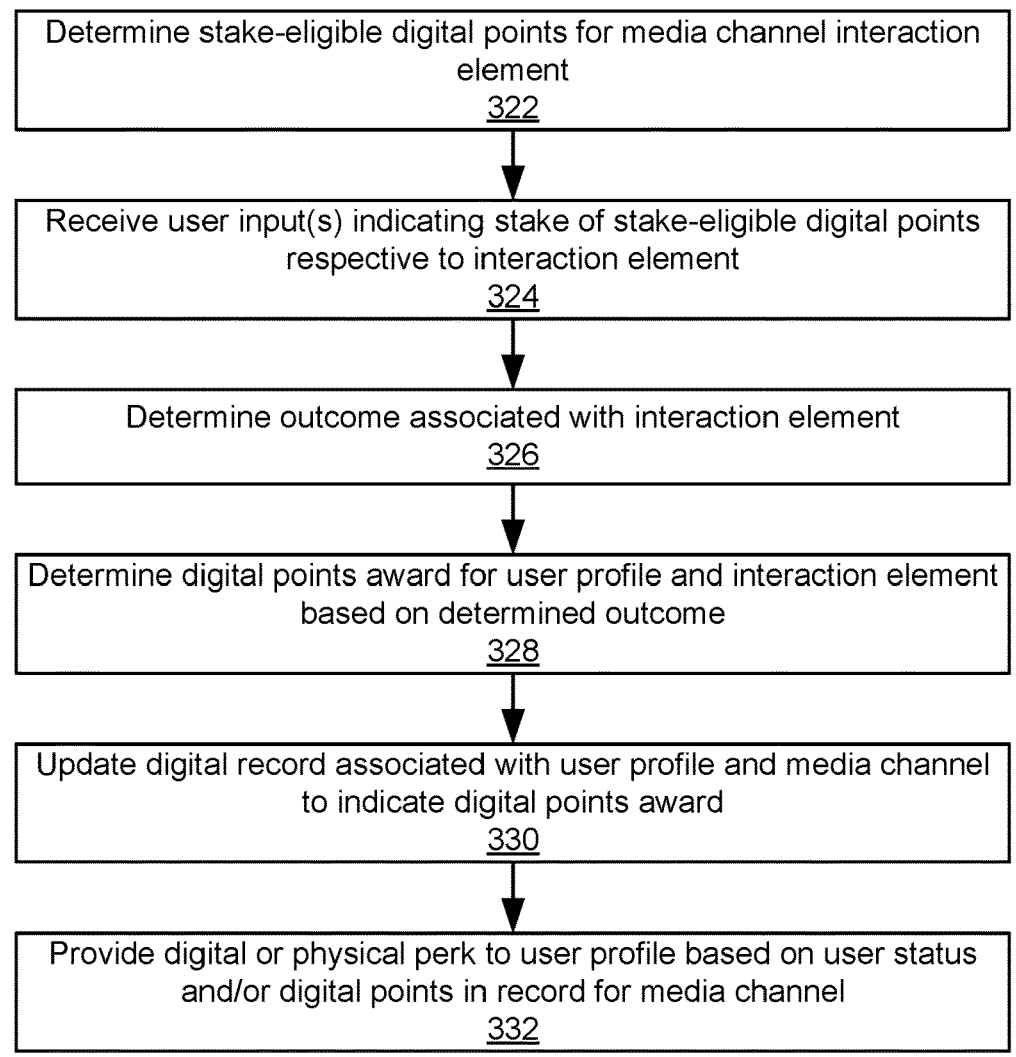
FIG. 3B is a flowchart of an example method for providing interaction with a media channel, such as by allowing digital points to be staked against a poll.

FIG. 3B is a flowchart 300b of an example method for providing interaction with a media channel and/or stream, for example, by allowing interaction with interaction elements, such as by facilitating staking digital points against an outcome of an interaction element by a user.

At 322, the system may determine stake-eligible digital points for the media channel's interaction element. The determination of whether or which points are eligible to be staked may be based on whether the points are associated with the channel (e.g., instead of a different channel), vested, associated with a user, or are otherwise eligible based on defined parameters. In some instances, multiple user profiles may be on an account or receiving device 104, so that each user has their own record of digital points. For example, determining the eligible points may include determining a quantity of digital points associated with a user profile and specific to a media channel from among a record of digital points for a plurality of media channels that is associated with the user profile.

In some implementations, the interaction element may include a living polling service and/or interface that receives votes or bets from users, as noted below. The stake-eligible points may be based on parameters specific to the interaction element, such as a maximum bet amount or award. The interaction element or a backend thereof may be hosted by the broadcast server 122, content server 118, or another device. For instance, a channel may use an interaction application 108 to create an interaction element before a televised game, post elements or polls during the game, or provide them after a game. The interaction element, for example, may ask users to stake digital points using a computed or defined over-under of the game, the total number of goals stored, an action by a certain player, or other defined parameter or outcome. The interaction application 108 may access remotely hosted information via a network 102 or other means.

At 324, the system may receive one or more user inputs indicating a stake of the stake-eligible digital points respective to the interaction element. For instance, the points earned by the user may be used to participate in activities, post bets, etc., as discussed above. The inputs may be received by the receiving device 104, for example, via a remote control and/or via one or more other devices, such as a client device 106.

For example, a channel may post or publish a live poll during a hockey game asking users if a player will score over two points. The interaction application 108 may display the live poll over or adjacent to a media stream of the hockey game displayed by a receiving engine. A user may use a remote control to provide input to the receiving device 104 selecting an input region and/or quantity of digital points to stake against the live poll, such as a bet whether the player will score over two points.

In some instances, the graphical interface/overlay may be updated to reflect the staked points, selected outcome, or other details, such as statistics reflecting inputs by other users (e.g., percentage of users who voted or bet for a certain outcome, average points staked, etc.). In some instances, the stake, statistics, outcomes, or other details may be updated on the interface/overlay periodically or in real time.

At 326, the system may determine an outcome associated with the interaction element. For instance, where an interaction element includes defined outcomes, such as whether or not a team will win a game, the enterprise application 126 may determine the outcome. The outcome may be determined based on analysis of data associated with the event or based on a manual input provided by the content provider/content server 118 or broadcast service/broadcast server 122. Similarly, where the interaction element includes a quiz, the interaction application 108 may determine a correct answer and whether the user input matched the correct answer. Where the interaction element includes a vote or poll, in some instances, the interaction application 108 may award additional points based on the interaction/participation instead of requiring a certain outcome.

At 328, the system may determine a positive or negative digital points award for the user profile and interaction element based on the determined outcome. For instance, the digital points award may be a positive or negative quantity, which is added or subtracted from the quantity of points stored in the record associated with the user profile and/or channel. For example, if a user chose correctly, the record of their points may be increased but, if the user chose incorrectly, the record of their points may be decreased.

At 330, the system may update the digital record associated with the user profile and the media channel or stream to indicate the digital points award. For instance, the interaction application 108 or enterprise application 126 may update an entry in a file associated with the user profile, channel, stream, event, and/or interaction element, as described above, to reflect the increased or decreased points. Similarly, where a status, badge, perk, or rank is associated with the quantity of digital points, this value may also be automatically updated.

At 332, the system may provide a digital perk or a physical perk to the user profile based on a user status and/or digital points in the record for the media channel. The perk may be a digital reward, such as a badge, access to other media, unlocking of additional functionality or content, or another digital perk. For instance, a quantity of points, user rank, or user status may cause the system (e.g., interaction application 108, enterprise application 126, or otherwise) to unlock access to additional media, interaction elements, or other rewards.

The system may also allow a user to redeem digital points for rewards, such as team t-shirts, event tickets (which may be sent digitally or physically), or otherwise.

Depending on the implementation, a channel may provide digital or physical rewards. In some instances, certain rewards may be provided based on user status or rank, such as when a user is in first, second, or third place in a certain location (e.g., a state or city) or over a certain time period (e.g., over a day, week, month, etc.). Accordingly, top users could win exclusive rewards, which may vary based on a time period.

Figure 3C:
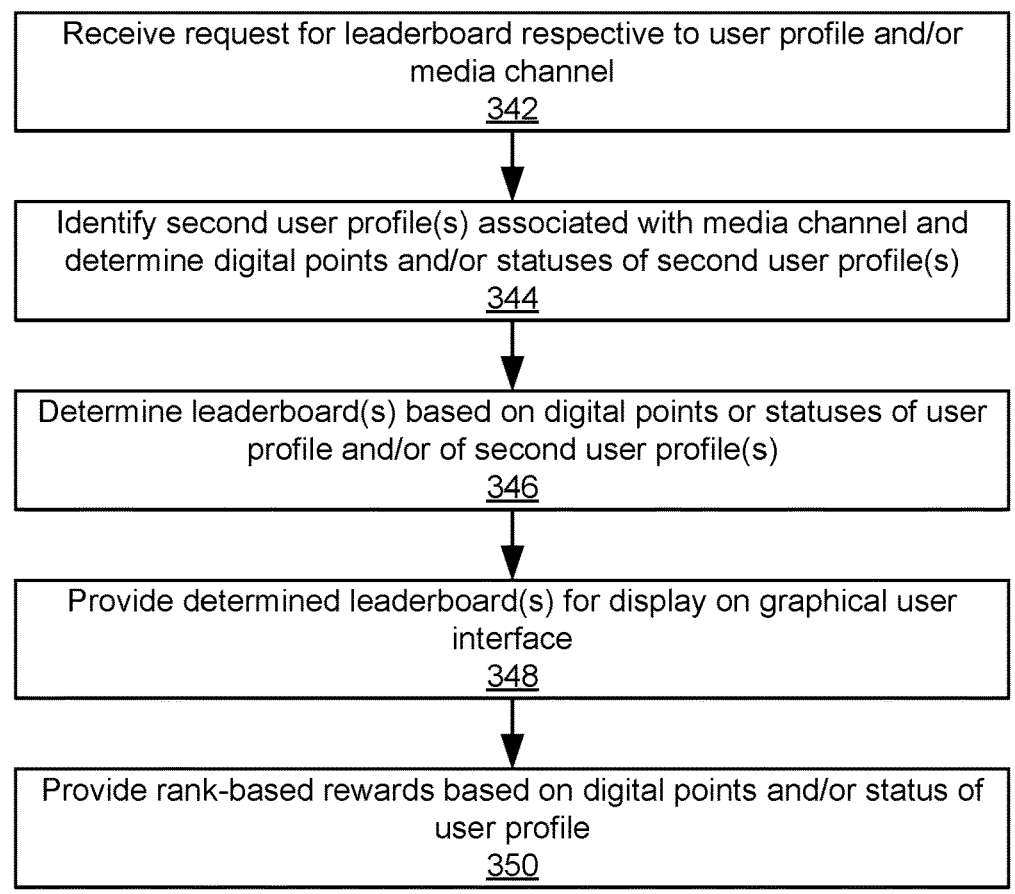
FIG. 3C is a flowchart of an example method for providing interaction with a media channel, such as by providing a customized leaderboard.

FIG. 3C is a flowchart 300c of an example method for providing interaction with a media channel and/or stream, for example, by providing a customized leaderboard for a user profile, channel, or other attribute, such as a contact list or social networking map.

At 342, the system may receive a request to access or display a leaderboard respective to the user profile and/or media channel. The request may indicate which leaderboard to display from a set of leaderboards. For instance, the leaderboard may be a global leaderboard, a local leaderboard, and/or a leaderboard ranking a user's social contacts or friends. Similarly, the leaderboard may be filtered based on a time period (e.g., weekly, monthly, yearly ranking). In some instances, once the interaction application 108 displays the leaderboard, it may be filtered, revised, or otherwise modified.

At 344, the system may identify one or more second user profiles associated with the media channel, stream, and/or user profile. The system may determine digital points and/or statuses of the second user profiles after identifying the second user profiles or the points or statuses may be used to identify the second user profiles. For example, the interaction application 108 and/or enterprise application 126 may identify one or more second user profiles based on digital points associated with the second user profiles and the media channel. For instance, a list of user profiles may be determined and/or ranked based on their digital points or statuses. For instance, the users with the highest quantity of points may be determined.

At 346, the system may determine one or more leaderboards based on the digital points and/or statuses of the user profile or of the second user profile(s) based on the request, second user profiles, and/or digital points of the second user profiles or other attributes.

In some implementations, other users associated (e.g., as contacts or friends) with or followed by a user may be specifically selected, ranked, or added to a leaderboard. For instance, the interaction application 108 or enterprise application 126 may identify the one or more second user profiles based on the second user profiles being associated as contacts of the user profile in a file accessible to the one or more processors. The file may be defined as a social graph with users followed or associated with a first user. In some implementations, a user may connect a social network profile with the interaction application 108 or enterprise application 126, which may retrieve a contact list and use it to determine contacts/friends to display on a leaderboard. Additionally, or alternatively, the interaction application 108 and/or enterprise application 126 may provide other social actions, such as sharing statuses or messages with contacts/friends or post on a social network.

At 348, the system may provide the determined leaderboard(s) for display on a graphical user interface. The leaderboard may be provided as an overlay, frame, banner, page, or separate interface, as described elsewhere herein. As noted above, the leaderboard may be filtered or modified automatically or by a user input. The leaderboard may be live and/or updated in real time.

In some implementations, the leaderboard may be broken down by day, week, month, season, or otherwise and, at the end of these timeframes, the top 10-20 users may be given exclusive rewards for their participation or rank.

The leaderboard may display a number of polls or interaction elements, etc., participated in; a number of games participated in or viewed, a number of polls or bets correctly picked, total digital points staked, total digital points won, or other details.

At 350, the system may provide one or more rank-based rewards based on the digital points in the user profile and/or based on the status or rank of the user profile.

Based on the points or ranks, the channel, content server 118, broadcast server 122, or other service may provide rewards for users based on points, status, or ranking. For example, rewards may include varying rewards posted on a channel or website, a one-on-one video chat with a sports player, tickets to a live or televised sports game, access to a pay-per-view event, being featured on a social media platform of a channel, or other rewards. Accordingly, as described above, virtual or physical rewards may be provided to the user.

Figure 4A:
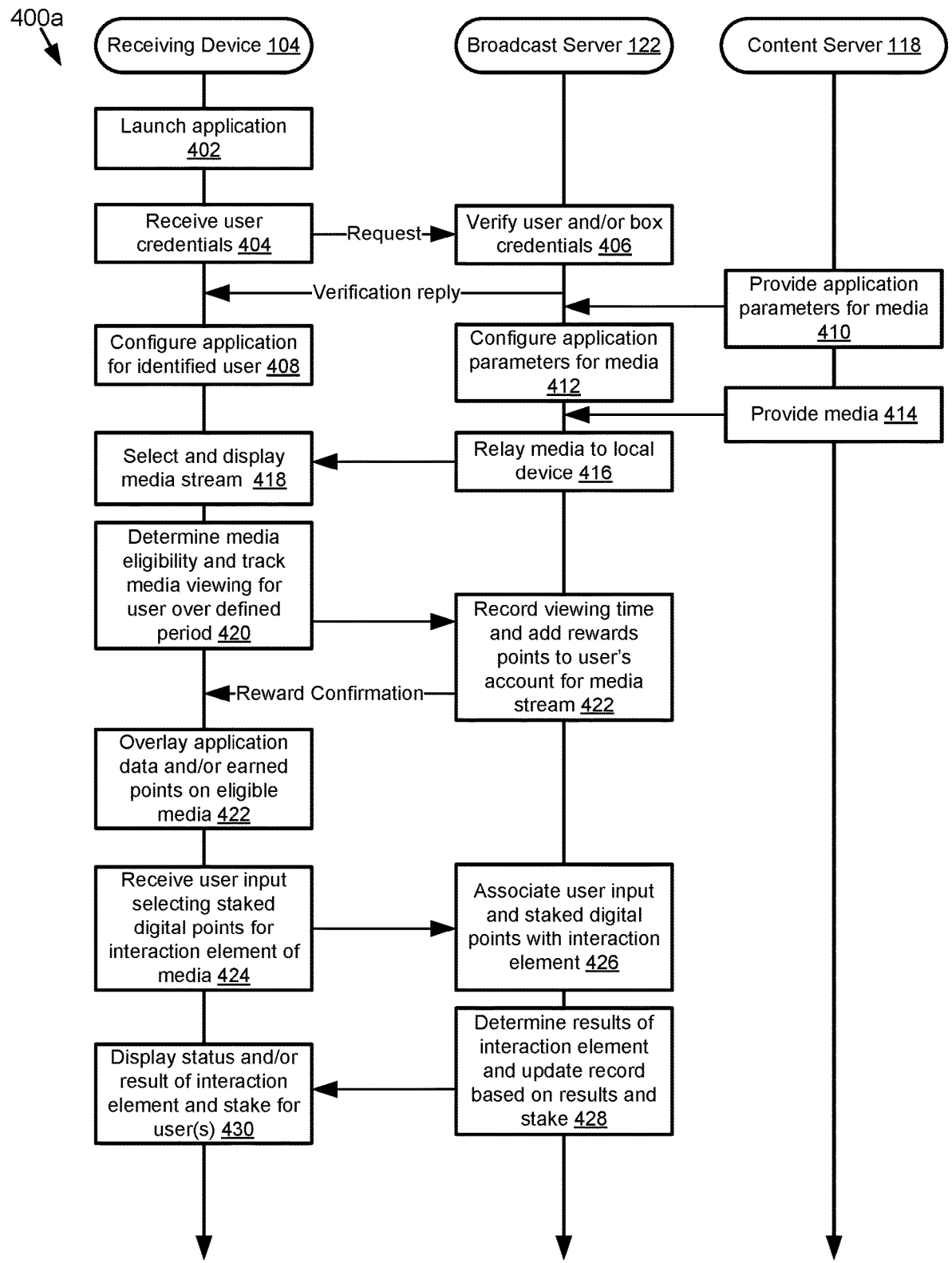
FIGS. 4A and 4B are example signal diagrams illustrating interaction between various devices, for example, for providing a media channel rewards application with live polling.

FIG. 4A is a signal diagram 400a for providing interaction between various devices, for example, to provide operations described elsewhere herein, such as in reference to FIGS. 3A-3C. It should be noted that the operations, devices, and signals are provided by way of example and that others are possible and contemplated herein.

At 402, an interaction application 108 may be launched on a receiving device 104, for example, by selecting an input on a remote control communicating with the receiving device 104. At 404, the interaction application 108 may receive user credentials, such as a login to an account and/or selection of a user profile from among one or more user profiles associated with the account. For instance, the receiving device 104 may transmit a request to authenticate a user or application instance to a broadcast server 122.

At 406, the broadcast server 122 may verify the user and/or box credentials. For instance, the broadcast server 122 may verify an instance of the interaction application 108 or the receiving device 104 based on a unique identification transmitted in the verification/authentication request. Additionally, or alternatively, the broadcast server 122 may verify login credentials provided by the user. Accordingly, in some cases, two-step authentication may be provided using the device or application identifier and the login credentials, thereby improving ease of use and/or security.

Upon verification/authentication, the broadcast server 122 may send a reply indicating to verify/authenticate the user to the interaction application 108, which, at 408, may configure the application for the identified user. For instance, the specified user's points, customized content, targeted advertising, or other information may be loaded or used.

In some implementations, at 410, the content server 118 or a stakeholder associated with the content server 118 may provide application parameters defining points awarded, time periods, interaction elements, or other attributes, as described above. In some instances, at 412, the parameters for the media may configured on or received by the broadcast server 122, which uses the parameters to perform the operations described above.

In some implementations, at 414, the content server 118 may transmit media (e.g., a stream data including an audio-visual program) to the broadcast server 122. For instance, at 416 the media relay engine 132 may relay or broadcast the media stream to receiving devices 104. At 418, the receiving device 104 may select (e.g., tune to a network, channel, station, or program) and display a media stream on a television 112 or other output device.

In some implementations, at 420, the receiving device 104 may determine media eligibility and track media viewing, interactions, or other statistics for the user profile over a defined period. For instance, upon tuning to a channel or stream/program for which the interaction application 108 is configured, the interaction application 108 may start a counter to time a viewing period for the output or displayed media. Once a defined period has elapsed on the receiving device 104, it may send a message to a broadcast server 122, which may record the viewing time and/or add digital reward points to a user's account for the media stream or channel at 422. The broadcast server 122 may send an acknowledgement or response to the receiving device 104 indicating that the message has been received and/or that the points have been successfully added. If no reply is received from the broadcast server 122, the receiving device 104 may resend the packet/message. This process may be repeated after each increment, which decreases bandwidth usage while improving reliability and accessibility of the points records.

At 422, the interaction application 108 on the receiving device 104 may overlay the application data and/or earned points on the eligible media, such as is described above. For instance, the points held by the user profile or an interaction element may be displayed.

At 424, the receiving device 104 may receive user input selecting staked/stakable digital points for an interaction element of the media stream/channel. For instance, the interaction application 108 may open an overlay, which displays polls (e.g., the receiving device 104 requests available polls to a broadcast server 122, which replies with a list or details of polls in which the user can participate). The user may select which polls and/or points to stake and the receiving device 104 may send a message to the broadcast server 122 indicating the staked points and aspects of the interaction element, such as which outcome is selected for a poll or bet. At 426, the broadcast server 122 may associate the user input and staked digital points with the interaction element (e.g., with a defined answer, result, outcome, etc.).

In some implementations, at 428, the broadcast server 122 and/or receiving device 104, for instance, may determine results or outcome of the interaction element and update the record of points, status, etc., based on the results and the stake. For instance, when a poll ends, the enterprise application 126 may determine that the poll has ended or that an outcome/result has been determined and may send a message to the receiving device 104 indicating that it has ended. In some instances, the message may include an indication of whether the user's stake won or lost. At 430, the receiving device 104 may display a status and/or result of the interaction element and stake for the user(s), as noted elsewhere herein.

Figure 4B:
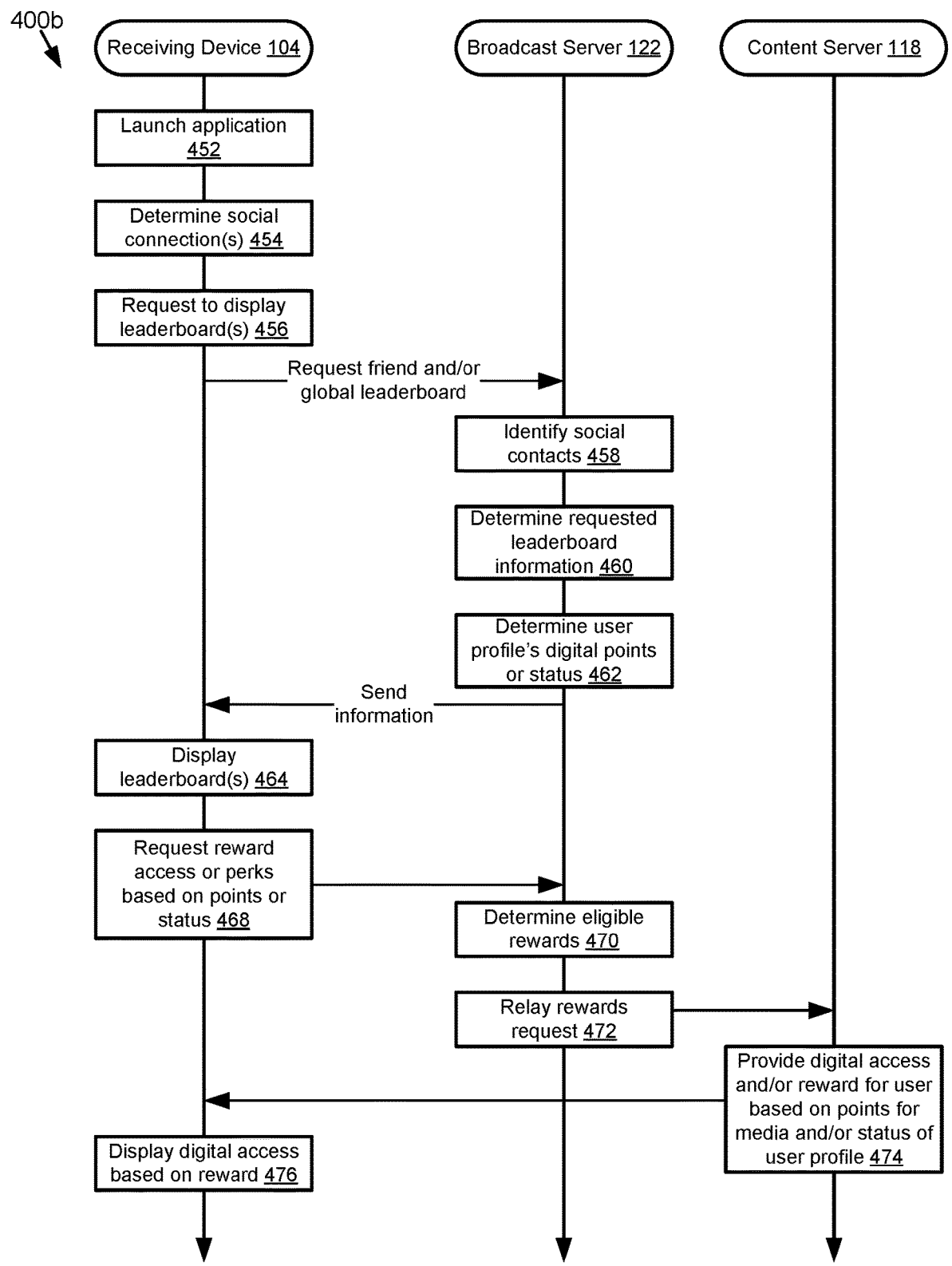

FIG. 4B is a signal diagram 400b of an example method for providing interaction between various devices, for example, to provide operations described elsewhere herein, such as in reference to FIGS. 3A-4A. It should be noted that the operations, devices, and signals are provided by way of example and that others are possible and contemplated herein. It should be noted that although operations of the signal diagram 400b are described in reference to a receiving device 104, some or all of these operations may be performed using a client device 106.

At 452, an interaction application 108 may be launched from a receiving device 104, which may display overlays or other interfaces, which may display information for a channel or provide other interactions. In some implementations, at 454, the interaction application 108 may determine social connections, for example, by a user selecting other users to follow, by contacts/friends identifying each other, or by logging in to a social network. The interaction application 108 may receive login information or may request access to a social graph.

At 456, the receiving device 104 may receive inputs and request to display one or more leaderboards, which may include transmitting a request for a friend, local, global, etc., leaderboard from a broadcast server 122. In instances where a friend-based leaderboard or status is requested, the broadcast server 122 may identify social contacts at 458, for example, using the social connections previously received from the user.

At 460, the broadcast server 122 may determine requested leaderboard information, such as rankings of other users whether they are contacts or not, depending on the request, as described above. At 462, the broadcast server 122 may determine digital points or status of a user profile, for example, to indicate the user's relative position or rank on a leaderboard. The broadcast server 122 may send the leaderboard and/or user's information to a receiving device 104.

At 464, the receiving device 104 may display the leaderboard(s) and/or other information, for example, on a television 112. For instance, the leaderboards may be display in an overlay, frame, banner, sidebar, separate page or interface, or otherwise.

In some implementations, at 468, the receiving device 104 may request reward access or perks based on the points and/or status (e.g., a relative rank), such as described above. For instance, the receiving device 104 may send a request to a broadcast server 122, which may determine eligible rewards at 470. In some instances, where rewards are provided by a content server 118 or other device, the broadcast server 122 may relay the rewards request at 472. In some instances, the receiving device 104 may send requests directly to the content server 118.

In some implementations, at 474, the content server 118 may provide rewards, such as digital access, digital rewards, or other rewards for the user based on the quantity of points, status, rank, etc., of the user profile for the associated channel, network, event, etc., as described above. In some instances, the digital access may include unlocking access to a file or media, etc., for example, by unlocking digital access to one or more digital media files by a client device 106 or receiving device 104 associated with the user profile, as noted above. In some instances, the rewards may include an interface showing physical or other rewards that may be redeemed. In some cases, the receiving device 104 may display the digital access based on the reward at 476.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system 100 and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats. Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
    measuring, by one or more processors, a viewing period of a media stream displaying media, including measuring a quantity of units of time representing the viewing period that is a specific length of time that media is displayed for which a corresponding quantity of digital points is determined;
    determining, by the one or more processors, the quantity of digital points respective to a user profile and the media stream based on the measured viewing period, wherein the determining the quantity of digital points includes determining a quantity of stake-eligible digital points specific to a media stream from among a record of digital points for a plurality of media streams that is associated with the user profile;

storing, by the one or more processors, a digital record associated with the user profile and the media stream, the digital record indicating the quantity of digital points; and providing, by the one or more processors, a graphical interface based on the quantity of digital points associated with the user profile and the media stream, wherein providing the graphical interface includes:

receiving, by a receiving device, the media stream using a satellite dish;

receiving, by the receiving device, data for the graphical interface from a web server based on the quantity of digital points associated with the user profile and the media stream; and generating, by the one or more processors, one or more graphical overlays overlaying the graphical interface on the media stream based on the quantity of digital points associated with the user profile and the media stream.

2. The computer-implemented method of claim 1, wherein providing the graphical interface based on the quantity of digital points associated with the user profile and the media stream includes:

unlocking digital access to one or more digital media files by a client device associated with the user profile.

3. The computer-implemented method of claim 1, further comprising:

determining, by the one or more processors, an outcome associated with an interaction element in the graphical interface;

determining, by the one or more processors, a digital points award respective to the user profile and the interaction element based on the outcome; and updating, by the one or more processors, the digital record associated with the user profile and the media stream, the updated digital record indicating the digital points award.

4. The computer-implemented method of claim 3, further comprising:

determining, by the one or more processors, stake-eligible digital points for the interaction element of the media stream; and receiving, by the one or more processors, one or more user inputs indicating a stake of the stake-eligible digital points respective to the interaction element.

5. The computer-implemented method of claim 4, further comprising:

providing, by the one or more processors, one or more of a digital reward and a physical reward for the user profile based on the updated digital record associated with the user profile and the media stream.

6. The computer-implemented method of claim 1, further comprising:

receiving, by the one or more processors, a request to display a leaderboard respective to the media stream;

determining, by the one or more processors, the leaderboard based on the request to display the leaderboard and digital points for the media stream associated with one or more second user profiles; and providing, by the one or more processors, the determined leaderboard for display on the graphical interface.

7. The computer-implemented method of claim 6, further comprising:

identifying, by the one or more processors, the one or more second user profiles based on digital points associated with the one or more second user profiles and the media stream, the leaderboard being further determined by a ranking of the one or more second user profiles.

8. The computer-implemented method of claim 7, wherein the one or more second user profiles are identified based on the one or more second user profiles being associated as contacts of the user profile in a file accessible to the one or more processors.

9. A system comprising:

one or more processors; and one or more memories storing instructions that, when executed by the one or more processors, cause the system to:

measure a viewing period of a media stream displaying media, including measuring a quantity of units of time representing the viewing period that is a specific length of time that media is displayed for which a corresponding quantity of digital points is determined;

determine a quantity of digital points respective to a user profile and the media stream based on the measured viewing period, wherein the determining the quantity of digital points includes determining a quantity of stake-eligible digital points specific to a media stream from among a record of digital points for a plurality of media streams that is associated with the user profile;

store a digital record associated with the user profile and the media stream, the digital record indicating the quantity of digital points; and provide a graphical interface based on the quantity of digital points associated with the user profile and the media stream, wherein providing the graphical interface includes:

receiving, by a receiving device, the media stream using a satellite dish;

receiving, by the receiving device, data for the graphical interface from a web server based on the quantity of digital points associated with the user profile and the media stream; and generating, by the one or more processors, one or more graphical overlays overlaying the graphical interface on the media stream based on the quantity of digital points associated with the user profile and the media stream.

10. The system of claim 9, wherein providing the graphical interface based on the quantity of digital points associated with the user profile and the media stream includes:

unlocking digital access to one or more digital media files by a computing device associated with the user profile.

11. The system of claim 9, wherein the instructions, when executed by the one or more processors, further cause the system to:

determine an outcome associated with an interaction element in the graphical interface;

determine a digital points award respective to the user profile and the interaction element based on the outcome; and update the digital record associated with the user profile and the media stream, the updated digital record indicating the digital points award.

12. The system of claim 11, wherein the instructions, when executed by the one or more processors, further cause the system to:

determine stake-eligible digital points for the interaction element of the media stream; and receive one or more user inputs indicating a stake of the stake-eligible digital points respective to the interaction element.

13. The system of claim 12, wherein the instructions, when executed by the one or more processors, further cause the system to:
provide one or more of a digital reward and a physical reward for the user profile based on the updated digital record associated with the user profile and the media stream.

14. The system of claim 9, wherein the instructions, when executed by the one or more processors, further cause the system to:
receive a request to display a leaderboard respective to the media stream;
determine the leaderboard based on the request to display the leaderboard and digital points for the media stream associated with one or more second user profiles; and
provide the determined leaderboard for display on the graphical interface.

15. The system of claim 14, wherein the instructions, when executed by the one or more processors, further cause the system to:
identify the one or more second user profiles based on the digital points associated with the one or more second user profiles and the media stream, the leaderboard being further determined using a ranking of the one or more second user profiles.

16. A system comprising:
a local receiving device configured to:
receive a media stream;
output the media stream to a display device coupled with the local receiving device; and
measure a viewing period of the media stream, the viewing period indicating a length of time during which local receiving device outputs the media stream to the display device; and
a remote server communicatively coupled with the local receiving device and configured to:
determine a quantity of digital points respective to a user profile and the media stream based on the measured viewing period, wherein the determining the quantity of digital points includes determining a quantity of stake-eligible digital points specific to a media stream from among a record of digital points for a plurality of media streams that is associated with the user profile;
store a digital record associated with the user profile and the media stream, the digital record indicating the quantity of digital points; and
provide a graphical interface based on the quantity of digital points associated with the user profile and the media stream, wherein providing the graphical interface includes:
causing the media stream to be transmitted via a satellite dish;
causing data for the graphical interface to be transmitted from a web server based on the quantity of digital points associated with the user profile and the media stream; and
causing one or more graphical overlays to be generated overlaying the graphical interface on the media stream based on the quantity of digital points associated with the user profile and the media stream.

\* \* \* \* \*